United States Patent
Antila et al.

(10) Patent No.: US 7,707,891 B2
(45) Date of Patent: May 4, 2010

(54) OPTICAL INTERFEROMETRIC PRESSURE SENSOR

(75) Inventors: Jarkko Antila, Mariehamn (FI); Dietmar Bertsch, Dornbirn (AT); Felix Mullis, Flums (CH); Martin Wüest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 12/163,303

(22) Filed: Jun. 27, 2008

(65) Prior Publication Data

US 2009/0320605 A1    Dec. 31, 2009

(51) Int. Cl.
*G01L 9/12*    (2006.01)
(52) U.S. Cl. .......................... 73/714; 29/407.08
(58) Field of Classification Search ............... 73/714, 73/718, 724; 29/407.08
See application file for complete search history.

(56) References Cited

U.S. PATENT DOCUMENTS

| | | | |
|---|---|---|---|
| 4,682,846 A | 7/1987 | Cowen | |
| 5,005,421 A | 4/1991 | Hegner | |
| 5,087,124 A | 2/1992 | Smith | |
| 5,954,900 A | 9/1999 | Hegner | |
| 6,506,313 B1 | 1/2003 | Fetterman | |
| 6,591,687 B1 * | 7/2003 | Bjoerkman et al. | 73/724 |
| 6,823,738 B1 | 11/2004 | Wlodarczyk | |
| 7,305,888 B2 * | 12/2007 | Walchli et al. | 73/714 |
| 7,500,300 B2 * | 3/2009 | Walchli et al. | 29/407.08 |
| 7,536,915 B2 * | 5/2009 | Strietzel et al. | 73/718 |
| 2002/0003917 A1 | 1/2002 | Sherrer | |
| 2004/0031326 A1 | 2/2004 | Lenzing | |
| 2006/0075823 A1 | 4/2006 | Grudzien | |
| 2007/0089524 A1 * | 4/2007 | Walchli et al. | 73/718 |
| 2008/0110008 A1 * | 5/2008 | Walchli et al. | 29/407.08 |
| 2008/0110269 A1 * | 5/2008 | Strietzel et al. | 73/718 |
| 2009/0158853 A1 * | 6/2009 | Berner et al. | 73/724 |

FOREIGN PATENT DOCUMENTS

| | | |
|---|---|---|
| DE | 10225934 | 1/2004 |
| EP | 0351701 | 1/1990 |

* cited by examiner

*Primary Examiner*—Andre J Allen
(74) *Attorney, Agent, or Firm*—Notaro & Michalos P.C.

(57) ABSTRACT

A pressure measuring cell has a first housing body and a membrane arranged proximate the housing body, both of ceramic. The membrane has a peripheral edge joined to the first housing body to create a reference pressure chamber. A second housing body made of ceramic material is opposite the membrane and is joined to the peripheral edge of the membrane, the second housing body together with the membrane forming a measurement pressure chamber. The second housing body has a port for connecting the pressure measuring cell to a medium to be measured. The first housing body, the second housing body and the membrane are tightly connected along the peripheral edge of the membrane in a central area of the first housing body a hole is formed, reaching through the first housing body and at least in the central region of the membrane and opposite the hole a surface of the membrane is formed as a first optically reflective area. An optical fiber is arranged and tightly fixed within the hole for feeding light onto the surface of the membrane. The end of the fiber reaches at least the surface of the first housing body and is formed as a second reflective optical area linking the surface so that between the fiber end and the reflection area an optical cavity is present which forms a measuring section for determining the level of deflection of the membrane and which is part of a Fabry-Perot Interferometer.

17 Claims, 1 Drawing Sheet

OPTICAL INTERFEROMETRIC PRESSURE SENSOR

FIELD OF THE INVENTION

The invention relates to an optical diaphragm gauge for measuring high vacuum pressure in a wide pressure range.

DESCRIPTION OF THE RELATED ART

It is known that pressures or pressure differences can be measured by applying pressure to a thin membrane and measuring its deflection. A known and suitable method for measuring the deflection is to design the membrane arrangement as a variable electrical capacitance where the capacitance change which correlates with the pressure change is evaluated by measurement electronics in a known manner. The capacitance is created by arranging a thin, flexible membrane very close to another surface and by depositing an electrically conductive film on both mutually opposed surfaces or by fabricating them from electrically conductive material. When pressure is applied to the membrane the deflection changes the distance between the two electrodes which leads to an analyzable capacitance change of the arrangement. Sensors of this type are mass-produced from silicon. The flat basic body as well as the membrane often consist entirely of silicon. There are also versions that are made of composite materials such as silicon with a glass substrate. Such sensors can be produced very economically. However, in vacuum applications pressure sensors of this type are normally usable only for higher pressures in the range of approx. $10^{-1}$ mbar to several bar. High resolution at pressures below $10^{-1}$ mbar is no longer achievable with silicon. One of the reasons for this is that the silicon surface reacts with the environment which impairs the sensitive sensor characteristic. Already water vapor that forms part of normal atmospheric air leads to a corresponding reaction on the surfaces. The problem becomes even more serious when the sensor is used in chemically aggressive atmospheres and especially with higher temperature up to some hundreds degree Celsius. For this reason attempts were made to protect such silicon sensors against external influences by passivating the surfaces. Attempts were also made to deposit protective coatings on the surfaces in order to improve the durability and the resistance against chemically aggressive environments as described in U.S. Pat. No. 5,318,928. Such measures are costly and in the case of mechanically deformable parts such as membranes have only limited success, in particular in highly aggressive media such as fluorine, bromic acid and their compounds which are typically used in vacuum etching processes.

For this reason attempts were made to build vacuum measuring cells entirely from corrosion resistant materials such as $Al_2O_3$. A known arrangement of this type is disclosed in U.S. Pat. No. 6,591,687, which is incorporated here by reference in its entirety.

This capacitive vacuum measuring cell (CDG) is made entirely out of ceramic, in particular $Al_2O_3$. This results in high corrosion resistance and long-term reproducibility. Only in the areas where sealing is required or where feedthroughs are provided are small amounts of materials other than $Al_2O_3$ used, if the $Al_2O_3$ is not fused without addition of the foreign material. A vacuum measuring cell consists of a first plate-shaped housing body above which a membrane, sealed along its edges, is arranged so that it encloses a reference vacuum chamber. On the side pointing away from the reference vacuum chamber there is a second housing body, also sealed along its edges, so that a measurement vacuum chamber is formed there. This measurement vacuum chamber features a port for connecting the medium to be measured. The surface of the first housing body and the membrane that form the reference vacuum chamber are coated with an electrically conductive film, for example, gold, and constitute the electrodes of the capacitance measuring cell. The electrodes are lead out, for example, through the first housing body or through the sealing area in the edge zones. The essentially parallel electrode surfaces are spaced apart from 2 µm to 50 µm. Sealing of the membrane in the edge zone against the two housings is preferably achieved through welding, for example, laser welding. Highly suitable and simple to use is also a glass brazing material that is corrosion resistant. Another possibility of achieving a sealing bond is to connect the housing parts diffusively, for example, in the green body state in which the objective is to completely avoid material other than $Al_2O_3$.

This measuring cell arrangement essentially allows a symmetric, preferably a flat disc shaped, design that avoids all stress in the housing. This is particularly important in order to achieve high measurement sensitivity combined with high accuracy and reproducibility. It also allows the utilization of a very thin ceramic membrane which is essential for reliably measuring vacuum pressures lower than 100 mbar, and in particular lower than 10 mbar, by means of capacitive, all-ceramic measuring cells. For this purpose membrane thicknesses of 10 µm to 250 µm are needed, where membrane thicknesses of 10 µm to 120 µm are preferred in order to achieve a very good resolution. Typical membrane thicknesses are, for example:

at 1000 Torr: membrane thickness 760 µm±10 µm
at 100 Torr: membrane thickness 345 µm±10 µm
at 10 Torr: membrane thickness 150 µm±10 µm
at 1 Torr: membrane thickness 100 µm±10 µm
at 0.1 Torr: membrane thickness 60 µm±10 µm
at 0.01 Torr: membrane thickness 40 µm±10 µm A further desired technical field is the application of a sensor for high pressure measurement, for example up to 1000 bar and at high temperature at several 100° C., for corrosive fluids as liquid and gas applications. An example of such liquid and gas applications are corrosion resistant pressure and vacuum sensors in oilwell downhole or drilling applications. For high pressure applications the membrane thickness can be even more than 760 µm e.g. up to several millimeters. The known capacitive membrane vacuum measuring cells are working with temperature of maximum 200° C.

A further approach to read out such a membrane measuring cell is using an optical read out technology for measuring the membrane deflection instead of the capacitive principle as it is described in the U.S. Pat. No. 7,305,888 B2 to Wälchli et al., which is incorporated here by reference in its entirety. The optical diaphragm gauge (ODG) design eliminates some disadvantages of the CDG design. The pressure depending deflection of the diaphragm is measured by an optical system in the sensor and the measured signal is then transported by means of an optical fiber to the optical signal conditioner unit, which subsequently converts the optical signal into an electrical signal. This signal can be transported over long distances (even kilometers) without signal degradation and without being influenced by environmental disturbances, mainly electro-magnetic noise, vibrations and ambient temperature changes.

Such a vacuum measuring cell has a first housing body and a membrane, both of $Al_2O_3$ ceramic or sapphire. The membrane is planar with a peripheral edge joined by a first seal to the first housing body to form a reference vacuum chamber. A second housing body of $Al_2O_3$ ceramic or sapphire opposite the membrane, is joined to the peripheral edge of the membrane by a second seal to form a measurement vacuum chamber. A port connects the vacuum measuring cell to a medium to be measured. At least in the central area of the first housing body, an optical transparent window is formed and at least the central region of the membrane has an optical reflective surface. Outside the reference vacuum chamber, in opposition to and at a distance from the window, an optical fibre is arranged for feeding in and out light onto the surface of the membrane.

A pressure difference between the two different sides of the elastic membrane causes the membrane to bend and by doing so, changing the optical cavity length accordingly. Light is focused through the sapphire housing or the window respectively onto the membrane semireflecting surface from where it, after experiencing interference phenomenon via multiple reflections between the two mirrors, is collected and analyzed using one of the several available methods (e.g. Fizeau interferometer (FISO Inc.), White light polarization interferometer (OPSENS Inc.), Michelson interferometer, spectrometer, . . . ), revealing the optical cavity length and thus the pressure difference across the diaphragm. The cell arrangement is therefore part of a Fabry-Perot Interferometer detection or analyzing arrangement. The thickness of the membrane together with its free diameter and the desired maximum bending define the pressure range to be used. The membrane diameter can be for example ca. 11 mm and its thickness 300 µm. Preferred ranges for the diaphragm diameter lay in the range of 5.0 mm to 80 mm, preferably 5.0 to 40 mm and the membrane thickness in the range of 10 µm to 10 mm, preferably in a range from 10 µm to 100 µm especially for vacuum applications and preferably in a range from 600 µm to 9 mm for high pressure applications.

The sensor cell described above having a single-crystal sapphire window or a single-crystal sapphire body together with a sapphire diaphragm to enable external optical readout by e.g. a ball lens. An optical fiber can then be used to transfer the signal away from the site to a readout unit. A disadvantage with using sapphire alone in the sensor cell is its price—machined single-crystal sapphire is very expensive. Secondly, having a combination of sapphire and ceramic $Al_2O_3$ introduces a small mismatch in the Coefficient of Thermal Expansion (CTE), which might pose problems in the temperature drift behavior, for example. To reduce this effect requires proper crystal orientation, an expensive and time consuming process. Thirdly, if one uses a sapphire window attached to a ceramic body, one increases the mechanical tolerance requirements for optical cavity parallelism.

Previous prior art implementation uses external optics such as ball lenses to focus the light onto the membrane. Due to different temperature expansion coefficients of the materials used there is the possibility of moving the measurement spot on the membrane or tilting of the light beam. In consequence the system can stress some instable behavior. In addition a large number of components are needed which makes the production of such a sensor cell costly.

It is an object of the present invention to avoid the afore mentioned disadvantages of the prior art interferometric membrane pressure measuring cell.

It is an object of the invention to provide a fiber optic membrane pressure measuring cell with a high accuracy and high stability which is reliable and which can be produced economically.

SUMMARY OF THE INVENTION

The inventive sensor capable for measuring high pressures at high temperatures is based on the Optical Diaphragm Gauge structure described in U.S. Pat. No. 7,305,888 B2 to Wälchli et al.

In the present invention the optical diaphragm gauge sensor (ODG-sensor) for measuring pressure is made out of mostly ceramic materials and having an optical fiber directly attached to a first housing body. The attachment of the fiber to ceramics, ceramics to ceramics bonding and formation of a suitable optical Fabry-Perot cavity is done by special adhesive sealing processes. In the resulting measuring cell, the movement of a diaphragm, indicating pressure, is measured by means of white light, or low coherence,—interferometry (WLI).

The pressure measuring cell including:
a first housing body made of ceramic material;
a membrane made of ceramic material and arranged proximate to said first housing body, said membrane being substantially planar and having a peripheral edge, the peripheral edge of said membrane being joined by a first edge sealing material to said first housing body in such a way that a reference pressure chamber is created between said first housing body and said membrane, said membrane having first and second opposing surfaces, the first surface of said membrane facing said first housing body and said first housing body having a surface facing said membrane;
a second housing body made of ceramic material and located opposite said membrane, said second housing body being joined to the peripheral edge of said membrane by a second edge sealing material, said second housing body together with said membrane forming a measurement pressure chamber, said second housing body including a port for connecting the pressure measuring cell to a medium to be measured;
said first housing body, said second housing body and said membrane being tightly connected along the peripheral edge of said membrane; and at least in the central area of the first housing body a hole is formed reaching through said first housing body and at least in the central region of the membrane and in opposite of the hole the surface of the membrane is formed as a first optically reflective area; and
an optical fiber is arranged within the hole of said first housing body and tightly fixed within said hole with fiber sealing means for feeding in and out light onto the surface of the membrane whereas the end of the fiber is preferably reaching at least said surface of the first housing body and that this fiber end is formed as a second reflective optical area for optical linking to said surface of the membrane in such a way that the arrangement between said fiber end and the reflection area of the membrane an optical cavity is present which is forming a measuring section for determining the level of deflection of the membrane and which is part of a Fabry-Perot Interferometer detection arrangement.

It is also possible to arrange more than one optical fiber at the first housing body to read out the optical signal reflected from the membrane.

A high temperature optical fiber, made out of e.g. fused silica or sapphire and coated with a protective coating, such as gold or copper, is attached to a ceramic (preferably $Al_2O_3$) ferrule by means of glazing or ceramic adhesive, or directly to a hole in the ceramic body of the sensor cell in such a way, that the fiber end comes through the structure. If a ferrule is used, then it will be attached to a hole in the ceramic body after the fiber attachment in a similar way. After hardening of the ceramic adhesive or the adhesive glass solder, respectively, the fiber end is grinded and/or polished to form the other partly reflecting mirror of the optical cavity to be measured. This polished fiber end can be without an optical coating, or it can be coated, preferably with a single layer of dielectric material, such as $Ta_2O_5$, to improve the optical reflectivity.

The needed hole in the ceramic can be formed by mechanical drilling, laser drilling, ultrasound drilling or it can be formed in the mold phase of the ceramic body.

Directly-coupled arrangement, compared to an arrangement with external optics, is mechanically very stable and suffers less from temperature expansion distortions than an arrangement with external optics. A reduction of the overall number of parts leads to a cost reduction. The ODG manufacturing cost becomes comparable to a CDG and the performance is better in terms of linearity, repeatability and relative resolution.

Large numerical aperture, resulting from the fiber characteristics, relaxes the tilting requirements of the optical cavity without requiring any more space for external optics but at the same time restricts the largest measurable gap being ca. 100-200 µm with the practical minimum being at ca. 5 µm due to analysis restrictions of the WLI-technique.

At temperatures beyond ca. 350° C. the glass solder begins to soften and therefore, if a nonsymmetrical force is applied to the sensor, the position of the membrane may start to change. This problem is solved with a solution replacing the glass solder by an adhesive that withstands temperatures up to 600° C. or even 1000° C. or even more without loosing its mechanical stability, preferably a ceramic adhesive with a Coefficient of Thermal Expansion (CTE) that is identical to the CTE of the ceramic $Al_2O_3$ body. To get the necessary vacuum tightness, the connections preferably can be sealed additionally with standard high temperature glass solder along the outside side walls of the sensor cell and preferably also outside of the ceramic body along the sealing means of the fiber.

An important feature of the invention is to form a mirror on the ceramic diaphragm surface by suitable screen printing technique and processing. This enables one to use cheap and well-established alumina parts as supposed to e.g. sapphire. Attaching an additional mirror onto the diaphragm by adhesives is cumbersome and for example epoxies cannot go up to 600° C. in temperature. To be able to use glaze as the mirror, its final surface roughness should not exceed 50 nm. The ceramic substrates are too rough and grainy to easily get a mirror-like finish on the surface without any post treatment. The surface roughness of the substrate can be from 40 nm up to 300 nm on the average over a 25 µm×25 µm area, depending on the material and manufacturing methods used. By screen printing a small plate (diameter e.g. 1-3 mm) of glass paste in the middle of the membrane, one can make a smooth, optical surface. The glass paste is first sintered and then fired at around 750-800° C. In liquid form the glass paste reflows to automatically create an extended spot with an even surface and cooling it down again to form a solid mirror changes the surface only a little. The resulting mirror thickness is preferably between 1-6 µm. Atomic Force Microscopy measurements show that the mirror surface is indeed smooth, having an average roughness of about 5-10 nm. If one wants to further improve the quality of the mirror surface, this glazed plate is now easy to polish, too. An optical coating for improving the reflectivity can be applied but is not obligatory. Using PVD or CVD methods to coat the mirrors are expensive and a coating made by evaporation or comparative methods directly on the ceramic membrane does not yield a good mirror due to the rough substrate surface structure of ceramics.

There is also a positive effect of having an unsmooth substrate surface under the now-formed smooth mirror. Due to viscosity of the glaze when the mirror is formed it is difficult to make a mirror very thin. The refractive index of the glaze is ca. 1.7, which means that e.g. a 6 µm thick mirror creates another optical gap in addition to the actual gap of interest, introducing a clear disturbance in the case of a smooth substrate in the calculated white-light interferogram. If one has a 'grainy' substrate, i.e. optically diffuse surface underneath the mirror, then that effect will be minimized.

However, if the substrate is made as non-diffusive as possible (that is smooth), and the mirror is of proper thickness so that the interference signal created by the glaze mirror layer does not interfere with the interferogram created by the pressure-sensing cavity, one can measure the temperature of the sensor cell by measuring the thickness of the mirror (reacting not to pressure, but only to temperature). At the same time the pressure-indicating gap change would be measured. For example having a mirror of 17 µm in thickness and the resolution of gap measurement of 0.1 nm, one gets as the temperature resolution ca. 0.4° C. Such a sensor could be optimized to be a temperature sensor alone. Making a mirror out of the glass paste gives us a reflection from its surface of only about 7% (approximately same as from the fiber). In fast applications where a lot of broadband light is not available in a short (some milliseconds) time span, the surface of the mirror can be optically coated (preferably a single layer of dielectric material, such as $Ta_2O_5$) to enhance the reflection.

The combination of above-mentioned issues enables one to manufacture an Optical Diaphragm Gauge Sensor (ODG-sensor) out of ceramics by well-known manufacturing processes, decreasing the material and manufacturing costs and relaxing mechanical tolerance requirements significantly. Even though it is not the preferred solution the fibre mounting and the glazing methods also work with sensors made with sapphire components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following the invention will be explained in further detail by example and schematically in conjunction with Figures. The Figures illustrate.

DETAILED DESCRIPTION OF THE PREFERRED EMBODIMENTS

Figure 1:
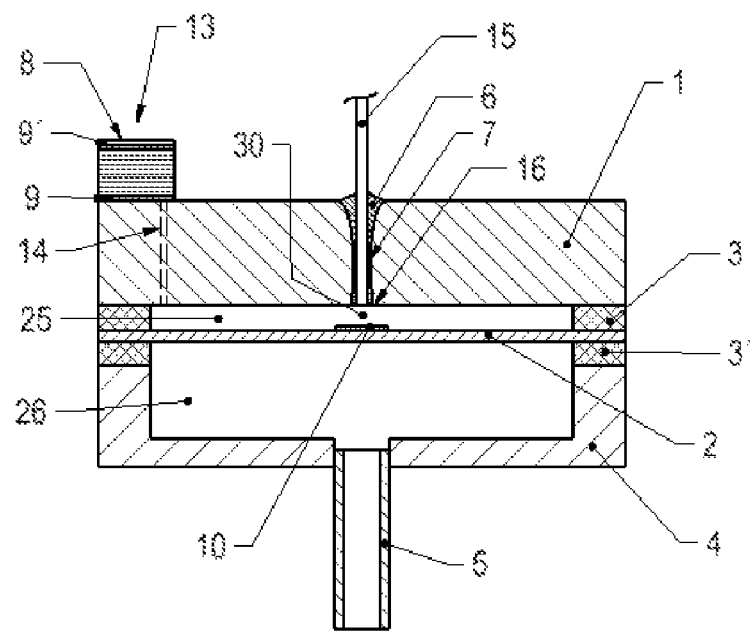
FIG. 1 schematically a cross section of an optical diaphragm gauge according to the invention with a fiber integrally mounted in a hole of the first housing body of the cell.

The preferred inventive arrangement of an ODG (Optical Diaphragm Measuring Cell) measuring cell made of $Al_2O_3$ with a structure essentially symmetrical about the membrane 2 is illustrated by the cross-section in FIG. 1. The first housing 1 body consists of a ceramic plate made of $Al_2O_3$ which along its edges is tightly bonded at a distance of 5 µm to 80 µm relative to the ceramic membrane 2 and which encloses a reference pressure chamber 25 which is preferably a vacuum chamber. The distance between the two surfaces is usually established directly during the assembly by means of the sealing material 3, 3' located between the membrane edge and the housing. In this way a completely plane housing plate 1 can be used. In the same way a measurement pressure chamber 26 is formed in a second housing body 4 on the opposite membrane side; this pressure chamber is accessible for the media to be measured via a connecting port 5 through an opening in the housing 4. The cell arrangement is especially suitable for measuring pressure of gas media with high pressure and especially for vacuum.

The seal 3, 3' on both sides of the membrane 2 defines, as mentioned above, the distance of the two housings 1 and 4. This seal consists, for example and preferably, of glass paste that is easy to handle and can, for example, be applied by means of screen printing. The prefusing or sintering temperature of this glass paste is preferably in the range of 630° C. to 800° C. And the sealing temperature is preferably in the range of 150 to 630° C.

In a typical measuring cell with an external diameter of 38 (preferred range 5-80, especially preferred 5-40) mm and a free internal membrane diameter of 30 mm (preferred range 4-75 mm) the distance 30 of the membrane 2 to the first housing body 1 is approx. 5 to 200 μm, preferably 5 to 80 μm or even preferably in a range of 10 to 25 μm. In this preferred example the first housing body 1 has a thickness of 2 to 10 mm, the second housing body 4 is for example the same thickness range. The first housing body 1 and the second housing body 4 must be made of materials having similar expansion coefficients as the used diaphragm materials. Very suitable combinations are high purity alumina ceramics (purity>96 preferably >99.5%), sapphal ceramics (alumina having a purity above 99.9%) and sapphire (single crystal high purity alumina, artificial corundum).

The inner area of the second housing body 4 is preferably designed with an inner recess, for example approx. 0.5 mm deep, as shown in FIG. 1, in order to enlarge the measurement pressure chamber 26.

On the reference pressure side on the surface of the membrane 2 a first optically reflective area is formed, preferably at least in the central region of the membrane 2. This area can be formed as a coating with a reflecting film forming a mirror coating 10. There are two ways of coating the diaphragm and the window or the first housing to create the Fabry-Perot interferometer. The principle ideas of coatings that can be used in the Fabry-Perot are well described in the literature (see Vaughan J M, The Fabry-Perot Interferometer, Adam Hilger Bristol and Philadelphia, 2002). In FIG. 9 of this reference both principle ways are schematically shown. Either you choose a mainly metallic or a dielectric system. The metallic coatings can be protected by dielectric coatings for easier further processing. A metallic mirror is preferably designed as a fully reflective film. This film 10 can, for example, be painted on, printed on, sprayed on, or be deposited by means of a vacuum process. Preferably this film contains mainly gold and is deposited by printing and is thickness is in the range of 0.1 μm to 1.0 μm Instead of a coating it is preferred to arrange a glass paste spot on this area and to bake it at high temperature e.g. in a range of 700 to 800° C. to create a glazed surface as reflecting area forming the desired mirror. This design forming a mirror by a glass spot is especially advantageous since it is easy to produce and withstands high temperature without any degradation of the high reflection quality needed of the so formed mirror surface.

Especially using designing the measuring cell arrangement as a vacuum measuring cell it is advantageous to add a getter chamber 13 which communicates with the reference vacuum chamber 25 to ensure good vacuum quality for a long lifetime of the measuring cell. An evacuation line 14 leads through the first housing plate 1 and is connecting the reference vacuum chamber 25 with the getter chamber 13 wherein a getter is placed which is not shown in FIG. 1. The getter chamber 13 is covered and closed for instance with a cover 8 by a sealing material 9' as a baked glass paste. The chamber can also be sealable fixed at the first housing body 1 with sealing means 9 as with baked glass paste.

An optical fiber 15 is arranged at least in the central area of the first housing body 1 passing said housing body 1 that the end of the fiber is reaching the reference pressure chamber 25. For this purpose a mounting hole 7 is formed in the housing body reaching through said first housing body 1 in opposite where at least in the central region of the membrane 2 the surface 10 of the membrane 2 is formed as a first optically reflective area 10. Said optical fiber 15 is arranged within the hole 7 of said first housing body 1 and tightly fixed within said hole 7 with fiber sealing means 6. The fiber 15 feeds in and out light onto the surface 10 of the membrane 2 whereas the end of the fiber 15 is reaching at least said surface of the first housing body 1 and that this fiber end 16 is formed as a second reflective optical area 16 for optical linking to said surface 10 of the membrane 2 in such a way that the arrangement between said fiber end 16 and the reflection area 10 of the membrane 2 an optical cavity 30 is present which is forming a measuring section for determining the level of deflection of the membrane 2 and which is part of a Fabry-Perot Interferometer detection arrangement.

For mounting the fiber 15 in the hole it is advantageous to let its end extend into the reference pressure chamber 25 preferably with a distance from the inner surface of the first housing body 1 of some tenth of a millimeter. This distance must be far enough that it is possible to grind and/or to polish down said end of the fiber 15 in a way that an even flat end surface over the whole diameter of the fiber 15 can be reached which is forming the second reflective optical area 16. This area acts as a semitransparent mirror. Preferably the fiber 15 is polished down to the same level of the inner surface of the first housing body 1. The distance between this second reflective area 16 of the end of the fiber 15 and the first reflective area on the membrane is in the range of 5 to 200 μm, preferably 5 to 80 μm which includes the cavity 30. This arrangement allows coupling the Fabry-Perot interferometer to the reflecting surface of the moving membrane 2 to be able to measure the deflection of the membrane 2 depending on the pressure to be measured. The incoming light is connected to the measuring cell by at least one optical fiber 15 and the resulting reflected optical signal is gathered by a least one fiber 15. It is also possible to have coated the end surface 16 of the fiber 15 inside of the reference pressure chamber 25 a partly transparent film, preferably with a semi-transparent film. This coating must withstand the backing temperature of several hundred ° C. when the measuring cell is mounted and backed together as described before with the mounting procedure.

It is also possible to use sapphire as first housing body 1. However this material is more expensive than $Al_2O_3$ ceramic.

While mounting the fiber 15 in a mounting hole 7 of the first housing body 1 the position of the fiber 15 is already predetermined in relation to the first reflecting area 10 on the membrane 2. It is an important issue that the even end plain 16 of the fiber 15 is aligned in parallel to said first reflection area 10 on the membrane with high precision. The tilt angle of deviation of parallelism should not exceed 1.0 mrad.

As sealing material 3, 3', 6 for mounting the membrane 2 and the housing bodies 1, 4 and for mounting the fiber 15 different glass paste is highly suitable. Different types can be chosen depending on the application temperature where the measuring cell should be operated. One preferred range of operating the cell is above 150° C. and up to 350° C. A further preferred range is from 150° C. up to 600° C.

A further very suitable sealing material instead of glass paste is to use a ceramic adhesive which withstands temperature of at least up to 650° C. or preferably at least up to 600° C. Such ceramic adhesive for instance is manufactured by Aremco Products, Inc., Valley Cottage, N.Y. 10989.

A further suitable method to join and seal the membrane 2 with the housing bodies is aluminum bonding whereas a small film or sheet of aluminum is used between the parts and pressed together with elevated temperature that diffusion occurs and that the aluminum is oxidized to aluminum-oxide.

All the above-mentioned methods can be used in combination and at different sealing positions.

Figure 2:
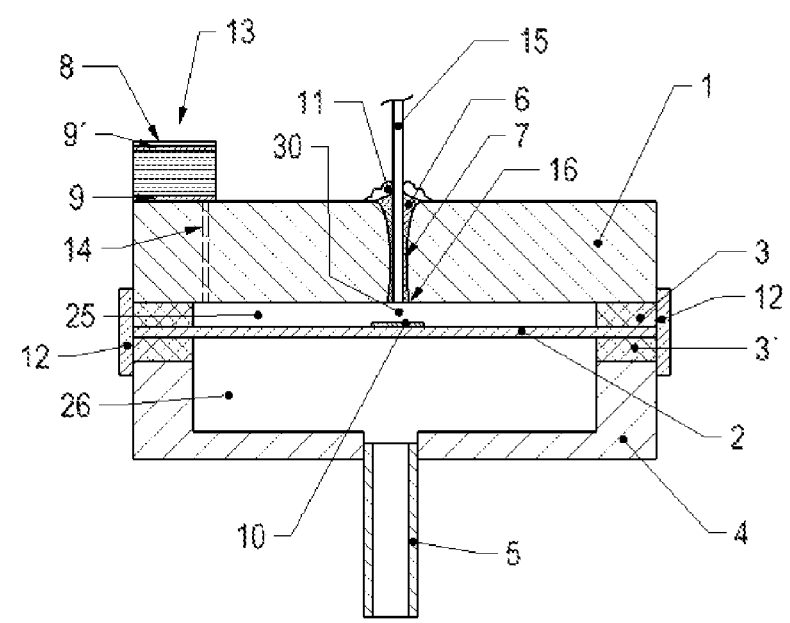
FIG. 2 schematically a cross section of an optical diaphragm gauge according to FIG. 1 with protection seal covering the sealing means at the peripheral edge of the membrane and the sealing means of the fiber.

To enhance tightness of the sealing means 3, 3', 6, 9, 9' additional protection sealing can be provided to cover said sealing means at its surface outside of the measuring cell as shown in FIG. 2. To form this protection sealing preferably a glass paste can be provided which forms after baking the paste a glazed protection seal 11, 12. It can cover either the sealing means 6 of the fiber or the sealing means 3, 3' at the peripheral edge of the membrane 2 connected to the hosing bodies 1, 4 or it can be applied on both of the sealing means arrangements. The protection seal 11, 12 is preferably used if ceramic adhesive is applied as sealing means 3, 3', 6. This additional protection seals 11, 12 are preferably used for the application of vacuum measuring sensor cells.

The inventive measuring cell can be entirely surrounded by a heater arrangement. With this heater arrangement the cell can be heated above the condensation temperature of the involved substances of the process to be measured especially with measuring vacuum pressure in vacuum processes. The temperature of the cell is set preferably at least 10° C. above the condensation temperature. An advantageous practical temperature is in the range of 100° C. to 600° C. Chemical substances used in such processes are often very aggressive and heating is an effective measure to keep it away from sensitive parts of the measuring cell. These measures ensure that the cell is working with high accuracy and high reproducibility during a long term of the executed processes.

A preferred embodiment of such a pressure measuring cell includes:

a first housing body 1 made of ceramic material;

a membrane 2 made of ceramic material and arranged proximate to said first housing body 1, said membrane being substantially planar and having a peripheral edge, the peripheral edge of said membrane 2 being joined by a first edge sealing material 3 to said first housing body 1 in such a way that a reference pressure chamber 25 is created between said first housing body 1 and said membrane 2, said membrane having first and second opposing surfaces, the first surface of said membrane 2 facing said first housing body 1 and said first housing body 1 having a surface facing said membrane 2;

a second housing body 4 made of ceramic material and located opposite said membrane 2, said second housing body 4 being joined to the peripheral edge of said membrane by a second edge sealing material 3', said second housing body 4 together with said membrane 2 forming a measurement pressure chamber 26, said second housing body including a port 5 for connecting the pressure measuring cell to a medium to be measured;

said first housing body 1, said second housing body 4 and said membrane 2 being tightly connected along the peripheral edge of said membrane 2 and at least in the central area of the first housing body 1 a hole 7 is formed reaching through said first housing body 1 and at least in the central region of the membrane 2 and in opposite of the hole 7 the surface 10 of the membrane 2 is formed as a first optically reflective area 10 and an optical fiber 15 is arranged within the hole 7 of said first housing body 1 and tightly fixed within said hole 7 with fiber sealing means 6 for feeding in and out light onto the surface 10 of the membrane 2 whereas the end of the fiber 15 is reaching at least said surface of the first housing body 1 and that this fiber end 16 is formed as a second reflective optical area 16 for optical linking to said surface 10 of the membrane 2 in such a way that the arrangement between said fiber end 16 and the reflection area 10 of the membrane 2 an optical cavity 30 is present which is forming a measuring section for determining the level of deflection of the membrane 2 and which is part of a Fabry-Perot Interferometer detection arrangement.

At least one of said housing bodies 1, 4 and/or of said membrane 2 is made at least partially from alumina ceramic $Al_2O_3$. In some cases it is advantageous that at least one of said housing bodies 1, 4 and/or of said membrane 2 is made at least partially from alumina ceramic $Al_2O_3$ from the type sapphire. In some cases it is also advantageous if only the membrane 2 is made from alumina ceramic $Al_2O_3$ which at least partially is from the type sapphire.

To produce a preferred pressure measuring cell arrangement for a cell application up to 350° C. the following steps are provided:

1. A through-hole 7 of e.g. 300 μm in diameter is drilled to a disc shaped plane $Al_2O_3$ first housing body 1 using preferably a high power pulsed $CO_2$ laser.
2. High temperature glazing paste 6 is added into the hole 7 so that it will be completely filled.
3. A suitable length of an optical fiber 15, for example ca. 10 cm of gold-coated fused silica fiber (e.g. graded-index multimode type, 62.5-μm core) or a sapphire optical fiber 15 is cleaved and inserted through the hole 7. The fiber 15 preferably extends beyond the surface of the housing side opposite of the side of fiber introduction.
4. Housing-fiber combination is furnaced/baked and bonded together in a furnace with firing temperatures typically being between 700-800° C. This creates a solid bonding of the fiber to the housing with the bonding being Helium leak tight at the same time.
5. From the front side of the housing 1 the fiber 15 together with the hardened glazing 6 is polished down to the level of the front surface side of the housing 1 resulting in an optical quality surface 16 on the fiber end.
6. Optional: The fiber end 16 can be optically coated, e.g. using PVD/CVD thin film deposition techniques, with single (such as $Ta_2O_5$) or multilayer dielectric coating or a semitransparent metal coating.
7. High temperature glazing paste 10 is e.g. screen-printed on a ceramic $Al_2O_3$ diaphragm/membrane 2, preferably in the central area to create an extended glazed spot of 1.0 to 10 μm thickness and to create a low-reflectance mirror 10 of e.g. 1.0-10.0 μm in thickness.
8. Optional: The membrane with the high temperature glass paste 10 is furnaced/baked in a separate step to create a low-reflectance mirror 10 of e.g. 1.0 to 6.0 μm thickness.
9. Optional: mirror surface 10 can be polished provided that the diaphragm 2 is thick enough to act as a stiff substrate.

10. Optional: The fiber end 16 and/or the mirror surface 10 can be optically coated having e.g. single or multilayer dielectric coating or a semitransparent metal coating.
11. The different parts are mounted together and furnaced in a vacuum furnace at a temperature lower than the melting temperature of the high-temperature glazing, i.e. typically at 550-650° C., in such a way that it does not affect the mirror 10 nor the fiber attachment 6.
12. Intermediate-temperature paste for glazing is added along the rim of the housings and/or on the diaphragm 2 and if applied on the $Al_2O_3$ on the getter chamber parts 13, 8, 9 by e.g. means of screen printing for mounting and closing this getter chamber 13.
13. Optional if a getter chamber is used: Low-temperature glazing 9' is added to the getter chamber parts e.g. by means of screen printing.
14. A standard CDG evacuation process is performed on the ODG sensor.
15. The welding of proper metal tubing as connection port 5 is done in the traditional way.
16. Next the mounting to the surrounding sensor structure, as placing the sensor into an insulated and heated box, will be done. It includes a small hole in the insulation and the wall of the box for the optical fiber feed-through.
17. Finally a standard connection for the fiber can be provided with typically known FC/PC or SC/PC connectors.

To produce a preferred pressure measuring cell arrangement for a cell application up to 600° C. the following steps are provided:

1. A through-hole 7 of e.g. 300 μm in diameter is drilled to a disc shaped plane $Al_2O_3$ housing body 1 using preferably a high power pulsed $CO_2$ laser.
2. Ceramic adhesive 6, e.g. Aremco 503 VFG is added into the hole 7 so that it will be completely filled.
3. A suitable length of an optical fiber 15, for example ca. 10 cm of gold-coated fused silica fiber (e.g. graded-index multimode type, 62.5-μm core) or a sapphire optical fiber 15 is cleaved and inserted through the hole 7. The fiber 15 preferably extends beyond the surface of the housing side opposite of the side of fiber introduction.
4. The ceramic adhesive 6 is cured according to it's specifications, e.g. at 93° C., 260° C. and 372° C.
5. High temperature glazing paste 12 is added on the back side of the housing to seal the ceramic bonding 6.
6. The glazing paste 11 is furnaced/baked in a furnace with firing temperatures typically being between 700-800° C. This creates a solid bonding of the fiber 15 to the first housing body 1 with the bonding forming a protection seal 11 being Helium leak tight.
7. From the front side of the housing 1 the fiber 15 together with the hardened ceramic adhesive is polished down to the level of the front side resulting in an optical quality surface on the fiber end.
8. High temperature glazing paste 10 is e.g. screen-printed on a ceramic $Al_2O_3$ diaphragm/membrane 2, preferably in the central area to create an extended glazed spot and to create a low-reflectance mirror 10 of e.g. 1.0-6.0 μm in thickness.
9. Optional: The mirror surface 10 can be polished providing the diaphragm 2 being thick enough to act as a stiff substrate.
10. Optional: The fiber end 16 and/or the mirror surface 10 can be optically coated having e.g. single or multilayer dielectric coating or a semitransparent metal coating.
11. Annular area of ceramic adhesive is added to the housings and/or on the diaphragm 2.
12. The different parts are mounted together and the ceramic adhesive is cured according to it's specifications, e.g. at 93° C., 260° C. and 372° C.
13. Intermediate temperature glazing 12 is added outside to the housings 1, 4 at the bonding lines to cover and seal the ceramic bonding 3, 3'.
14. Optional if a getter chamber is used: Low-temperature glazing 9, 9' is added to the getter chamber parts e.g. by means of screen printing.
15. The glazing is furnaced/baked at a temperature lower than the melting temperature of the high-temperature glazing, i.e. typically at 550-650° C. this way not affecting the mirror nor the fiber attachment.
16. A standard CDG evacuation process is performed on the ODG sensor and also the welding of proper metal tubing as connection port 5 is done in the traditional way.
17. Next the mounting to the surrounding sensor structure, as placing the sensor into an insulated and heated box, will be done. It includes a small hole in the insulation and the wall of the box for the optical fiber feed-through.
18. Finally a standard connection for the fiber can be provided with typically known FC/PC or SC/PC connectors.

Alternatively to produce a preferred pressure measuring cell arrangement for a cell application up to 600° C. the following steps are provided:

1. A through-hole 7 of e.g. 300 μm in diameter is drilled to a disc shaped plane $Al_2O_3$ first housing body 1 using preferably a high power pulsed $CO_2$ laser.
2. Very High temperature glazing paste 6 is added into the hole 7 so that it will be completely filled
3. A suitable length of an optical fibre 15, for example ca. 10 cm of sapphire fiber is cleaved and inserted through the hole 7. The fiber preferably extends beyond the surface of the housing side opposite of the side of fiber introduction.
4. Housing-fiber combination is furnaced/baked and bonded together in a furnace with firing temperatures typically being around 1300° C. This creates a solid bonding of the fiber 15 to the first housing body 1 with the bonding being Helium leak tight at the same time.
5. From the front side of the housing 1 the fiber 15 together with the hardened glazing 6 is polished down to the level of the front side resulting in an optical quality surface 16 on the fiber end.
6. Optional: The fiber end 16 can be optically coated, e.g. using PVD/CVD thin film deposition techniques, with single (such as $Ta_2O_5$) or multilayer dielectric coating or a semitransparent metal coating.
7. Very high temperature glazing is e.g. screen-printed on a ceramic $Al_2O_3$ diaphragm/membrane 2, preferably in the central area to create an extended glazed spot and to create a low-reflectance mirror 10 of e.g. 1.0-6.0 μm in thickness.
8. Optional: mirror surface 10 can be polished provided that the diaphragm 2 is thick enough to act as a stiff substrate
9. Optional: The fiber end 16 and/or the mirror surface 10 can be optically coated having e.g. single or multilayer dielectric coating or a semitransparent metal coating.
10. Very high-temperature paste for glazing is added along the rim of the housings and/or on the diaphragm 2 and if applied on the $Al_2O_3$ on the getter chamber parts 13, 8, 9 by e.g. means of screen printing for mounting and closing this getter chamber 13.
11. The different parts are mounted together and furnaced at around 1300° C. Due to the low viscosity of the glazing material the already-polished fiber 15 does not significantly move from its original position during the process.

12. Optional if a getter chamber is used: Low-temperature glazing 9, 9' is added to the getter chamber parts e.g. by means of screen printing.
13. A standard CDG evacuation process is performed on the ODG sensor only using a high temperature glazing and also the welding of proper metal tubing as connection port 5 is done in the traditional way.
14. Next the mounting to the surrounding sensor structure, as placing the sensor into an insulated and heated box, will be done. It includes a small hole in the insulation and the wall of the box for the optical fiber feed-through
15. Finally a standard connector for the fiber can be provided with typically known FC/PC or SC/PC connectors.

Subsequently some numbers and values are given as preferred examples which helps to define the configuration and the production method in addition for the presented inventive pressure measuring cell. The following design values are given as examples for a suitable and preferred configuration and/or production method.

1. Selection of a fiber 15:
   62.5/125 μm Graded Index Silica Multimode Fiber
   Core Diameter: 62.5 μm±3 μm
   Cladding Diameter: 125 μm±3 μm
   Coating Outside Diameter: Gold 155 μm, ±15 μm
   Temperature Limit: 700° C.
2. Definition of the quality of grinding and/or polishing, which relates to a minimum necessary output signal (the numbers depends from the chosen analyzer technology):
   a) Interferometer Based System:
      needs preferably 30%, min. 15% contrast of the interferogram. Contrast being defined as (max-min)/average value.
      to achieve such numbers, the fiber polishing must fulfill the following specifications:
         Core edge above/below centre of fiber: <=50 nm
         Tilt angle of the fiber end plane 16: <=1 mrad
         Roughness of the fiber end plane: <=10 nm (rms)
   b) Spectrometer Based System:
      needs preferably 5%, min. 1% contrast of the interferogram
      such numbers are achievable with standard or even worse polishing specifications according to standard connector specifications:
         Core edge above/below centre: <=250 nm
         Tilt angle of the fiber end plane 16: <=2 mrad
         Roughness of the fiber end plane: <=50 nm (rms)
3. Definition of extended glass spot 10 arranged on the membrane 2 as mirror 10, respective active optical area, flat area, reflectance, surface quality, diameter, thickness:
   Minimum thickness of active area (glass spot): On a reflective membrane less than or equal to 6.0 μm, no limit for diffuse membrane surfaces
   Suitable thickness of active area by screen printing (unpolished): 1.0-10.0 μm.
   Glass type: HIGH temperature (700 to 800° C.)
   Minimum diameter of active, flat area: 100 μm
   Minimum diameter of active, flat area, with manufacturing (centering) tolerances: 1 mm
   Typical portion of usable area (diameter) related to entire area (diameter of the glass spot): 50% minimum
   E.g.: Spot diameter 3.8 mm, active area diameter 1.9 mm
   Preferable glass spot outer diameter: 3-4 mm
   Index of refraction: 1.723 (@405 nm) to 1.653 (@1551 nm)
   Reflectance (power) in vacuum: 7% (@405 nm) to 6% (@1551 nm)
   Optimum reflectance: when fiber-end 16 and glass spot 10 have identical reflectances of about 30% (achieved by adding an optical coating)
   Minimum reflectance: Approx. 6%
   Surface Quality:
      Roughness <=50 nm (RMS), scratch-dig designation at least 60-40.
4. Tilt angle as deviation angle from the parallelism of the two optical reflection surfaces/areas of the fiber end 16 and the surface of the glass spot 10 (the numbers depends from the chosen analyzer technology):
   a) Interferometer Based System:
      needs preferably. 30%, min. 15% Contrast
      to achieve such numbers, the max. tilt angle may not exceed 1 mrad
   b) Spectrometer Based System
      needs preferably 5%, min. 1% Contrast
      to achieve such numbers, the max. tilt angle may not exceed 2 mrad
5. Optical distance 30 between fiber end 16 and surface of glass spot 10 (cavity):
   operating range of the distance: 5 to 200 μm, preferably 5 to 80 μm. (especially good results with high signal output can be achieved in some arrangements in a range of 10 to 25 μm).

While specific embodiments of the invention have been shown and described in detail to illustrate the application of the principles of the invention, it will be understood that the invention may be embodied otherwise without departing from such principles.

We claim:

1. A pressure measuring cell comprising:
   a first housing body (1) made of ceramic material;
   a membrane (2) made of ceramic material and arranged proximate to said first housing body (1), said membrane being substantially planar and having a peripheral edge, the peripheral edge of said membrane (2) being joined by a first edge sealing material (3) to said first housing body (1) in such a way that a reference pressure chamber (25) is created between said first housing body (1) and said membrane (2), said membrane having first and second opposing surfaces, the first surface of said membrane (2) facing said first housing body (1) and said first housing body (1) having a surface facing said membrane (2);
   a second housing body (4) made of ceramic material and located opposite said membrane (2), said second housing body (4) being joined to the peripheral edge of said membrane by a second edge sealing material (3'), said second housing body (4) together with said membrane (2) forming a measurement pressure chamber (26), said second housing body including a port (5) for connecting the pressure measuring cell to a medium to be measured;
   said first housing body (1), said second housing (4) body and said membrane (2) being tightly connected along the peripheral edge of said membrane (2);
   and at least in the central area of the first housing body (1) a hole (7) is formed reaching through said first housing body (1) and at least in the central region of the membrane (2) and opposite the hole (7), a surface of the membrane (2) is formed as a first optically reflective area (10);

an optical fiber (15) is arranged to bring light to and from the hole (7) of said first housing body (1) for feeding in and out light onto the surface of the membrane (2) and means are provided for forming a second reflective optical area for optical linking to said surface of the membrane (2) in such a way that in the arrangement between said means and the reflection area (10) of the membrane (2) an optical cavity (30) is present forms a measuring section for determining the level of deflection of the membrane (2) and which is part of a Fabry-Perot Interferometer detection arrangement; and wherein the surface of the membrane (2) at least in the region opposite to the hole (7) is covered by an extended flat glass spot which surface forms the first optically reflective area (10).

2. A measuring cell according to claim 1 wherein at least one of said housing bodies (1, 4) and said membrane (2) is made at least partially from alumina ceramic $Al_2O_3$.

3. A measuring cell according to claim 2 wherein at least one of said housing bodies (1, 4) and said membrane (2) is made at least partially from alumina ceramic $Al_2O_3$ comprising sapphire.

4. A measuring cell according to claim 2 wherein said membrane (2) is made from alumina ceramic $Al_2O_3$ at least partially of sapphire.

5. A measuring cell according to claim 1 wherein the surface of the fiber end with its second reflective optical area (16) corresponds with the plane of said inner surface of said first housing body (1).

6. A measuring cell according to claim 1 wherein at least one of the first edge sealing material (3) and the second edge sealing material (3') is a glass solder withstanding temperatures at least up to 350° C.

7. A measuring cell according to claim 1 wherein at least one of the first edge sealing material (3) and the second edge sealing material (3') is a glass solder withstanding temperatures at least up to 600° C.

8. A measuring cell according to claim 1 wherein at least one of the first edge sealing material (3) and the second edge sealing material (3') is an aluminum bonding that is oxidized to aluminum-oxide.

9. A measuring cell according to claim 1 wherein at least one of the first edge sealing material (3) and the second edge sealing material (3') is a ceramic adhesive withstanding temperatures at least up to 600° C.

10. A measuring cell according to claim 1 wherein the fiber sealing means (6) is a glass solder withstanding temperatures at least up to 350° C.

11. A measuring cell according to claim 1 wherein the fiber sealing means (6) is a ceramic adhesive withstanding temperatures at least up to 600° C.

12. A measuring cell according to claim 9 wherein at least one of the first edge sealing material (3) and second edge sealing material (3') and the fiber sealing means (6) are covered outside of the measuring cell arrangement with an additional protection sealing of glass solder material.

13. A measuring cell according to claim 1 wherein a thin film coating is applied to at least one of the surface of said the fiber end surface (16) and said reflection area (10) of the membrane (2).

14. A measuring cell according to claim 1 wherein the membrane (2) has a thickness in the range of 10 μm to 250 μm.

15. A measuring cell according to claim 1 wherein the measuring cell arrangement includes a first housing body (1), a second housing body (4) and a mem-brane (2) forming a disc shaped arrangement with a diameter in the range of 5 to 80 mm.

16. A measuring cell according to claim 1 wherein the measuring cell arrangement is formed as a vacuum measuring cell arrangement wherein the reference pressure chamber (25) is a vacuum chamber and the measurement pressure chamber (26) is formed as a measurement vacuum chamber.

17. A method of manufacturing a pressure measuring cell comprising:

providing a first housing body (1) made of ceramic material;

providing a substantially planar membrane (2) made of ceramic material and arranged proximate to said first housing body (1), and said membrane (2) having a peripheral edge, the peripheral edge of said membrane (2) will be joined by a first edge sealing material (3) to said first housing body (1);

creating a reference pressure chamber (25) between said first housing body (1) and said membrane (2), said membrane having first and second opposing surfaces, the first surface of said membrane (2) facing said first housing body (1) and said first housing body (1) having a surface facing said membrane (2);

providing a second housing body (4) made of ceramic material and located opposite said membrane (2), said second housing body (4) being joined to the peripheral edge of said membrane by a second edge sealing material (3'), said second housing body (4) together with said membrane (2) forming a measurement pressure chamber (26), said second housing body including a port (5) for connecting the pressure measuring cell to a medium to be measured;

said first housing body (1), said second housing (4) body and said membrane (2) being tightly connected along the peripheral edge of said membrane (2);

providing at least in the central area of the first housing body (1) a hole (7) reaching through said first housing body (1);

providing at least in the central region of the membrane (2) and in opposite of the hole (7) a surface area (10) of the membrane (2) by forming as a first optically reflective area (10); and providing an optical fiber (15) to bring light to and from the hole (7) of said first housing body (1) for feeding in and out light onto the surface of the membrane (2) and means are provided for forming a second reflective optical area for optical linking to said surface of the membrane (2) in such a way that in the arrangement between said means and the reflection area (10) of the membrane (2) an optical cavity (30) is present which forms a measuring section for determining the level of deflection of the membrane (2) and which is part of a Fabry-Perot Interferometer detection arrangement; and covering the surface of the membrane (2) at least in the region opposite to the hole (7) with an extended flat glass spot, which surface forms the first optically reflective area (10).

* * * * *